US007497274B1

(12) United States Patent
Randall et al.

(10) Patent No.: US 7,497,274 B1

(45) Date of Patent: Mar. 3, 2009

(54) HYDRAULIC FLUID TANK FOR DRILLING MACHINE

(75) Inventors: Guy P. Randall, Wooster, OH (US); Neil M. Baker, Gambier, OH (US); Christopher L. Shepherd, Orrville, OH (US)

(73) Assignee: Astec Industries, Inc., Chattanooga, TN (US)

( * ) Notice: Subject to any disclaimer, the term of this patent is extended or adjusted under 35 U.S.C. 154(b) by 283 days.

(21) Appl. No.: 11/338,196

(22) Filed: Jan. 24, 2006

(51) Int. Cl.
*B23Q 5/00* (2006.01)

(52) U.S. Cl. ........................ 173/152; 175/122; 175/162

(58) Field of Classification Search ................ 175/122, 175/162; 173/152
See application file for complete search history.

(56) References Cited

U.S. PATENT DOCUMENTS

| | | | | | |
|---|---|---|---|---|---|
| 2,602,437 | A | * | 7/1952 | Tancred | 125/11.01 |
| 3,910,358 | A | * | 10/1975 | Martinek | 173/152 |
| 4,000,879 | A | | 1/1977 | Martin et al. | |
| 4,441,520 | A | * | 4/1984 | Bruso et al. | 137/44 |
| 4,475,604 | A | | 10/1984 | Albertson et al. | |
| 4,496,032 | A | * | 1/1985 | Sommer | 188/180 |
| 4,945,999 | A | | 8/1990 | Malzahn | |
| 5,778,990 | A | * | 7/1998 | Niemi | 175/27 |
| 5,941,320 | A | * | 8/1999 | Austin et al. | 175/27 |
| 5,964,306 | A | * | 10/1999 | Barbera | 175/122 |
| 6,189,628 | B1 | * | 2/2001 | Jenne | 175/52 |
| RE37,923 | E | | 12/2002 | Keating et al. | |
| 6,814,161 | B1 | * | 11/2004 | Draney et al. | 175/19 |
| 6,962,166 | B2 | * | 11/2005 | Dudra | 137/558 |

OTHER PUBLICATIONS

MWC Albert Beasley, Jr. "Fluid Power" 1990 Edition, Naval Education and Training Command, pp. 9-1 to 9-13.*

* cited by examiner

*Primary Examiner*—Jennifer H. Gay
*Assistant Examiner*—Cathleen R Hutchins
(74) *Attorney, Agent, or Firm*—Chambliss, Bahner & Stophel, P.C.

(57) ABSTRACT

A hydraulic fluid tank for a drilling machine includes a primary chamber and a secondary chamber. The primary chamber is located entirely below the hydraulic pump of the drilling machine, and the secondary chamber is located above and in fluid communication with the primary chamber. The secondary chamber is adapted to maintain a hydraulic fluid level that is above the pump suction centerline of the drilling machine pump as the hydraulic fluid in the tank reaches its normal operating temperature during operation of the drilling machine. The secondary chamber is also sized and configured to allow for thermal expansion of hydraulic fluid in the amount of at least about 5% of the total tank volume as the hydraulic fluid in the tank reaches its normal operating temperature during operation of the drilling machine.

19 Claims, 5 Drawing Sheets

HYDRAULIC FLUID TANK FOR DRILLING MACHINE

FIELD OF THE INVENTION

This invention relates generally to the hydraulic system of a drilling machine. More particularly, the invention relates to a hydraulic fluid tank for such a machine.

BACKGROUND AND DESCRIPTION OF THE PRIOR ART

Many utility lines, pipelines and other underground components are installed in or under the ground by boring a borehole in a generally-horizontal direction in the ground rather than by digging a trench. This type of construction, which is sometimes referred to as "horizontal boring", "directional drilling" or "horizontal directional drilling", eliminates the need to excavate earth in order to install an underground component, and thereby saves several steps in the installation process. If no trench is dug, there will be no trench to fill, and no disturbed surface to reclaim. The horizontal drilling machine may be operated to drill a pilot bore along a planned path underground. Typically, the planned path is generally arcuate in shape from the entry point at the surface of the ground, continuing underneath a roadway, river or other obstacle, to the exit point at the surface on the other side of the obstacle.

A typical directional drilling machine includes a thrust frame that can be aligned at an oblique angle with respect to the ground. Mounted on a drive carriage on the thrust frame is a pipe-rotation mechanism that is adapted to rotate a series of interconnected pipe sections (commonly referred to as a drill string) about a boring axis. The drive carriage also includes a carriage drive assembly that is adapted to push the carriage along the thrust frame. The combination of rotation of the drill string and longitudinal movement of the drive carriage along the thrust frame causes the drill string to be advanced into or withdrawn from the ground.

To drill a hole using a directional drilling machine, the thrust frame is oriented at an oblique angle relative to the ground, and the drive carriage is retracted to an upper end of the frame. A pipe section is unloaded from a magazine and is coupled to the pipe-rotation mechanism on the drive carriage. A boring tool or cutting head is mounted to the distal end of the pipe, and the drive carriage is driven in a downward direction along the inclined thrust frame. As the drive carriage is driven downwardly, the pipe-rotation mechanism rotates the pipe about the boring axis, thereby causing the pipe (with boring tool mounted thereon) to drill or bore a hole.

As the drilling operation proceeds, the drill string is lengthened by adding pipe sections to the string. Typically, the pipe sections are provided with a male threaded connector on one end and a female threaded connector on the other end. Each time a pipe section is added to the drill string, the pipe section being added is aligned with the drill string and the threaded connector on its distal end is mated with the threaded connector on the proximal end of the drill string. Obviously, either the pipe section being added or the drill string must be restrained against rotation while the other component is rotated to engage the threaded connector on the distal end of the pipe section with the threaded connector on the proximal end of the drill string to create a secure threaded connection between the components.

During drilling using a horizontal directional drill, drilling fluid can be pumped through the drill string, over the boring tool at the distal end of the drill string and back up through the hole, to remove cuttings and displaced dirt. After the boring tool reaches a desired depth, it can be directed along a generally horizontal path and back up to break the surface of the ground at a distant point. To control the direction of the borehole, a boring tool with an angled-face may be used. When the direction of the borehole must be changed, the drill bit is positioned with the angled-face oriented in the desired direction. The drill string is then pushed through the ground without rotation, and the angled-face of the boring tool causes the drill string to deflect in the desired direction. This ability to change the direction of travel of the drill string also allows the operator to steer the drill string around underground obstacles like large roots and rocks.

Sufficient lengths of pipe are added to the drill string as needed to reach the exit point where the boring tool emerges from the earth. When the original bore is complete, it may be enlarged by replacing the boring tool with an enlarging device, commonly known as a backreamer. The backreamer is connected to the distal end of the drill string and moved through the original bore back towards the boring machine, either with or without rotation of the drill string. The backreamer expands and stabilizes the walls of the bore, generally while pulling a utility line or other underground component through the enlarged bore behind it. Movement of the backreamer back towards the drilling machine is accomplished by driving the drive carriage in a rearward direction on the thrust frame to withdraw a pipe section, disconnecting the withdrawn pipe section from the drill string, connecting the next pipe section in the drill string to the pipe rotation mechanism on the drive carriage and repeating the process until all of the pipe sections have been withdrawn from the ground. As each pipe section in the drill string is uncoupled from the drill string, it is loaded back into the pipe section magazine of the directional drilling machine.

Directional drilling machines frequently include a plurality of hydraulic motors and hydraulic actuators. Generally these hydraulic systems require one or more hydraulic pumps and a hydraulic fluid storage tank of significant size. In conventional directional drilling machines, the hydraulic fluid tank is raised above the centerline of the pump suction port or ports in order to provide sufficient head for efficient operation. However, such constructions result in a high center of mass of the machine, which makes it somewhat unstable. In addition, such constructions place the hydraulic fluid tank adjacent to the pump or pumps and/or the driving engine, thereby enlarging the machine's profile or making it difficult to access the pumps and/or engine for service. It would be desirable if a hydraulic tank construction for a drilling machine could be provided that would overcome these disadvantages of conventional constructions.

ADVANTAGES OF A PREFERRED EMBODIMENT OF THE INVENTION

Among the advantages of a preferred embodiment of the invention is that it provides a hydraulic fluid tank for a drilling machine which minimizes interference with access to the hydraulic pumps and other components of the machine. Another advantage of a preferred embodiment of the invention is that it provides a tank which does not result in a high center of mass of the machine. Still another advantage of a preferred embodiment of the invention is that it provides a hydraulic fluid tank that is arranged and configured for increased efficiency due to thermal expansion of the hydraulic fluid.

Additional objects and advantages of this invention will become apparent from an examination of the drawings and the ensuing description.

EXPLANATION OF TECHNICAL TERMS

The terms "above", "upwardly" and similar terms, as used herein to indicate the position of a component of a hydraulic fluid tank or a drilling machine relative to another component, refer to a position higher in elevation when the tank or machine is in its normal operating configuration.

The terms "below", "downwardly" and similar terms, as used herein to indicate the position of a component of a hydraulic fluid tank or a drilling machine relative to another component, refer to a position lower in elevation when the tank or machine is in its normal operating configuration.

As used herein, the "front" or "front end" of the drilling machine refers to the end on which the stakedown assembly is mounted.

As used herein, the "rear" or "rear end" of the drilling machine is the end opposite the front end.

The term "forward" and similar terms, as used herein to describe a relative position or direction on or in connection with a drilling machine, refer to a relative position or direction towards the front of the machine.

The terms "backward", "rearward" and similar terms, as used herein to describe a relative position or direction on or in connection with a drilling machine, refer to a relative position or direction towards the rear of the machine.

The term "depth" may be used herein to describe the distance from the top to the bottom of a chamber of a hydraulic fluid tank. As used to describe the secondary chamber, the term "depth" may also refer to the distance from the top of the secondary chamber to the top of the primary chamber.

The term "hydraulic systems" is used herein to describe the components of a drilling machine which perform a function using hydraulic fluid.

The term "normal operating temperature" is used herein to describe a relatively narrow range of temperatures of the hydraulic fluid in a hydraulic fluid tank of a drilling machine that is operating under normal operating conditions, which range of temperatures is reached after the hydraulic systems have been operated during operation of the drilling machine so that the specific temperature of the hydraulic fluid is maintained within such range during continued operation of the machine.

The term "normal operating conditions" is used herein to describe the conditions under which a drilling machine having a hydraulic fluid tank is operated according to generally accepted practices. Such conditions include beginning operation of the drilling machine with a level of hydraulic fluid in the tank within the range recommended by the manufacturer of such machine.

SUMMARY OF THE INVENTION

The invention comprises a hydraulic tank for a drilling machine, which machine includes a hydraulic pump having a pump suction port that includes a pump suction centerline. The hydraulic tank has a tank volume and comprises a primary chamber and a secondary chamber. The primary chamber is located entirely below the hydraulic pump of the drilling machine. The secondary chamber is located above the primary chamber and is in fluid communication therewith. The secondary chamber is adapted to maintain a hydraulic fluid level that is above the pump suction centerline. Furthermore, the secondary chamber is sized and configured to allow for thermal expansion of hydraulic fluid in the amount of at least about 5% of the tank volume as the hydraulic fluid in the tank reaches its normal operating temperature during operation of the drilling machine.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
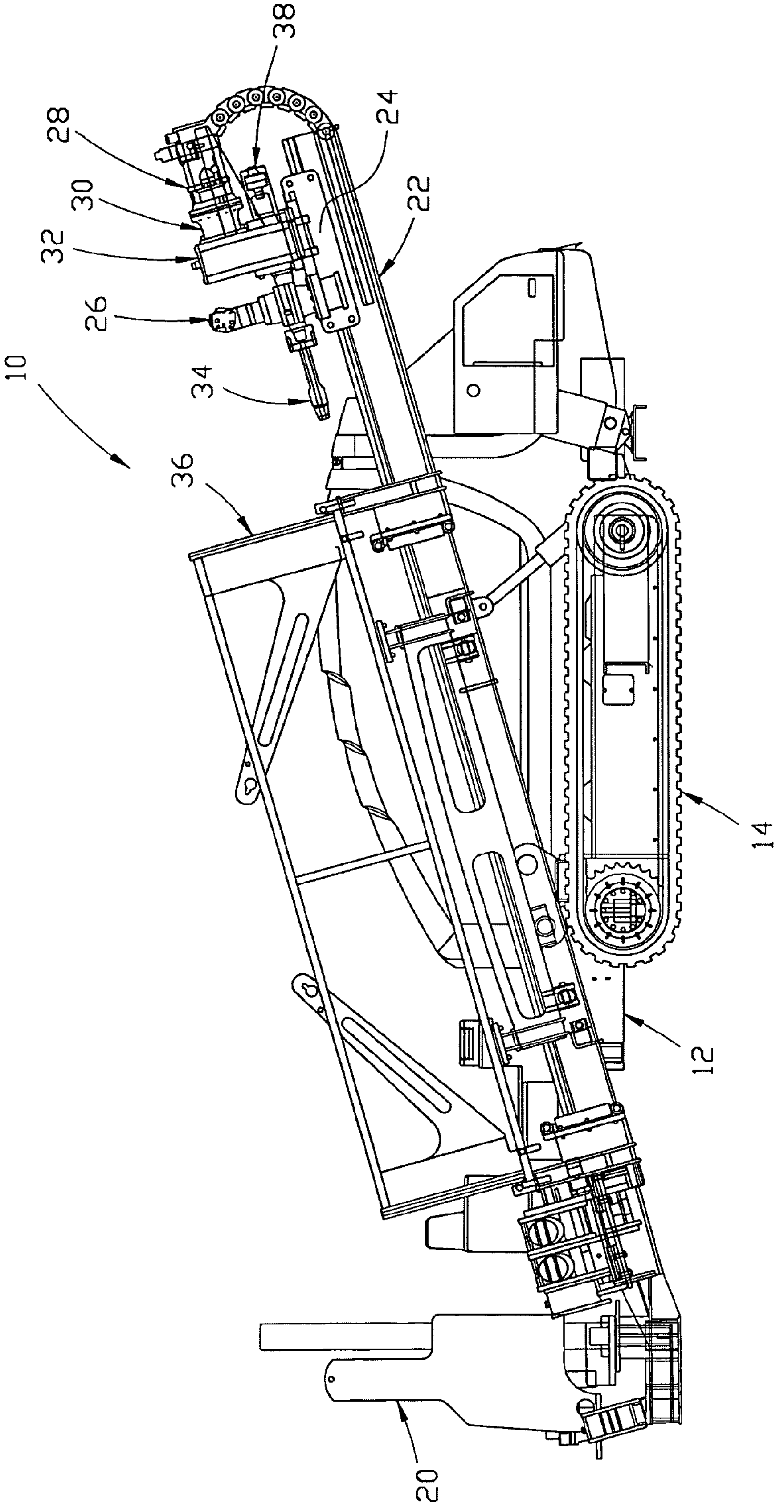
FIG. 1 is a side view of a horizontal directional drilling machine which includes a preferred embodiment of the invention. In this view, the thrust frame is raised to a drilling position.
Figure 2:
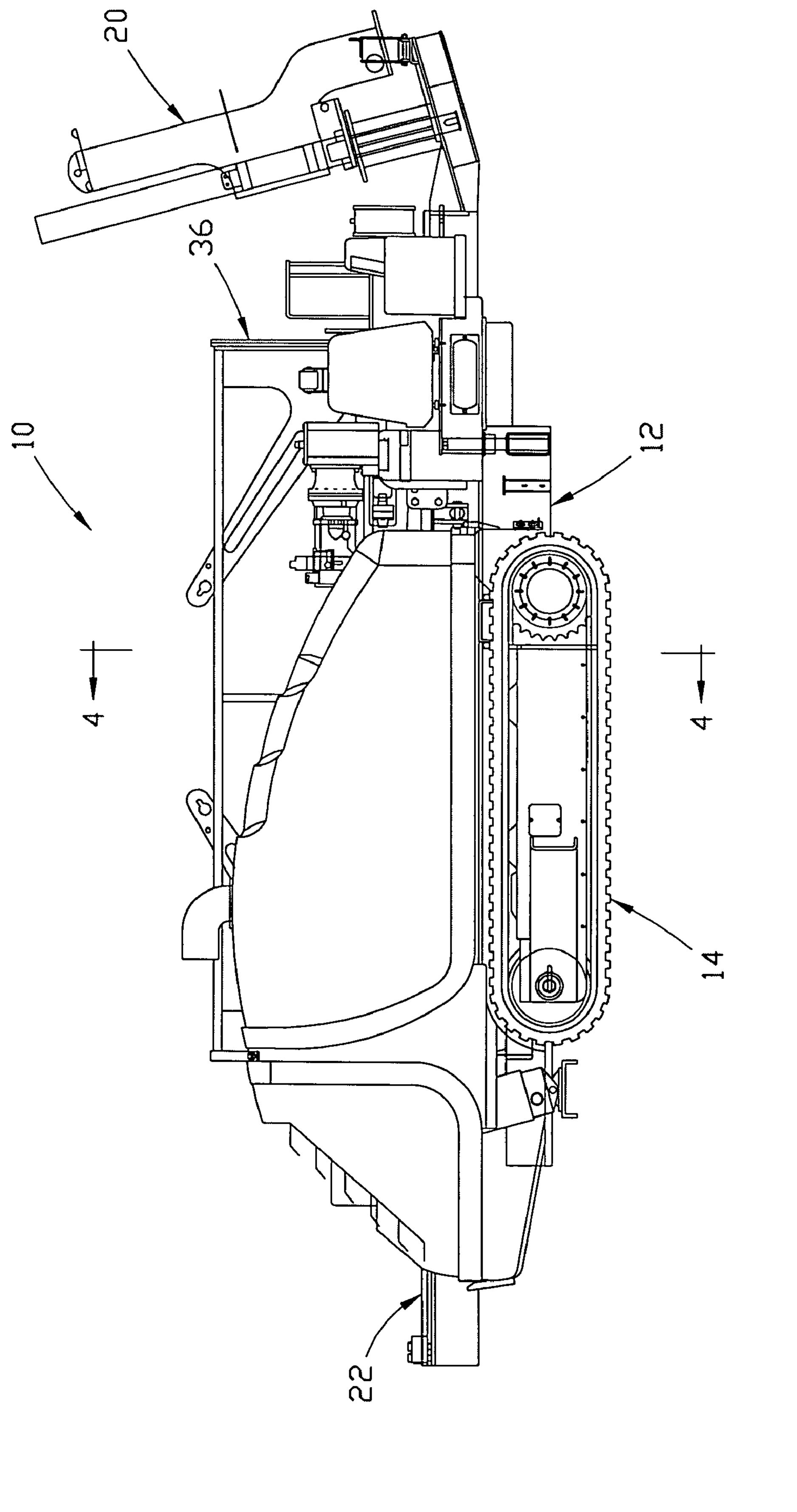
FIG. 2 is a view of the opposite side of the horizontal directional drilling machine of FIG. 1, with the thrust frame lowered.

The drawings illustrate a horizontal directional drilling machine 10 which includes a preferred embodiment of the invention. As shown in FIGS. 1 and 2, preferred machine 10 includes chassis 12 and is driven by a conventional drive system. This drive system includes track drive 14, engine 16 (shown in FIG. 3 and in outline in FIG. 4), and other conventional drive components (not shown) as are known to those having ordinary skill in the art to which the invention relates. The chassis has a base level 18 (shown in FIG. 4) on or above which engine 16 and other components are mounted. Machine 10 also includes stakedown assembly 20, which is pivotally connected to the forward end of thrust frame 22 at the front end of the machine. When thrust frame 22 is tilted to the drilling position (as shown in FIG. 1), the pivotal connection of stakedown assembly 20 allows the stakedown assembly to be oriented level with the ground surface to assist in securing the machine in place.

Drive carriage 24 (best shown in FIG. 1) is mounted on thrust frame 22 and adapted to be driven therealong by a conventional carriage drive assembly which includes a pair of hydraulic motors (only one of which, motor 26, is shown in FIG. 1), each of which drives a pinion (not shown) that engages racks (also not shown) located on opposite sides of the thrust frame. Drive carriage 24 also includes a pipe-rotation mechanism comprising hydraulic motor 28 which operates to transmit rotary motion through planetary gearbox 30 and rotary gearbox 32 to spindle 34. The spindle is threaded to engage with one end of a pipe section so that the pipe section can be secured to the pipe-rotation mechanism. Pipe section magazine 36 is adapted to receive and store a plurality of pipe sections (not shown) which may be joined together to form a drill string. A pipe section handling assembly (not shown) is provided to remove the pipe sections, one after another, from pipe section magazine 36 during a drilling operation. The pipe section handling assembly connects each pipe section to the proximal end of the drill string and to spindle 34, so that rotation of the spindle, coupled with movement of the drive carriage along thrust frame 22 towards the front of machine 10 will drive the drill string into the ground. Drive carriage 24 also includes drilling fluid connector 38, through which a supply of drilling fluid may be pumped by conventional means (not shown) during the drilling operation. After the drilling operation is completed, the pipe section handling assembly and carriage are employed to remove each pipe section, one after another, from the drill string during a backreaming operation.

Figure 3:
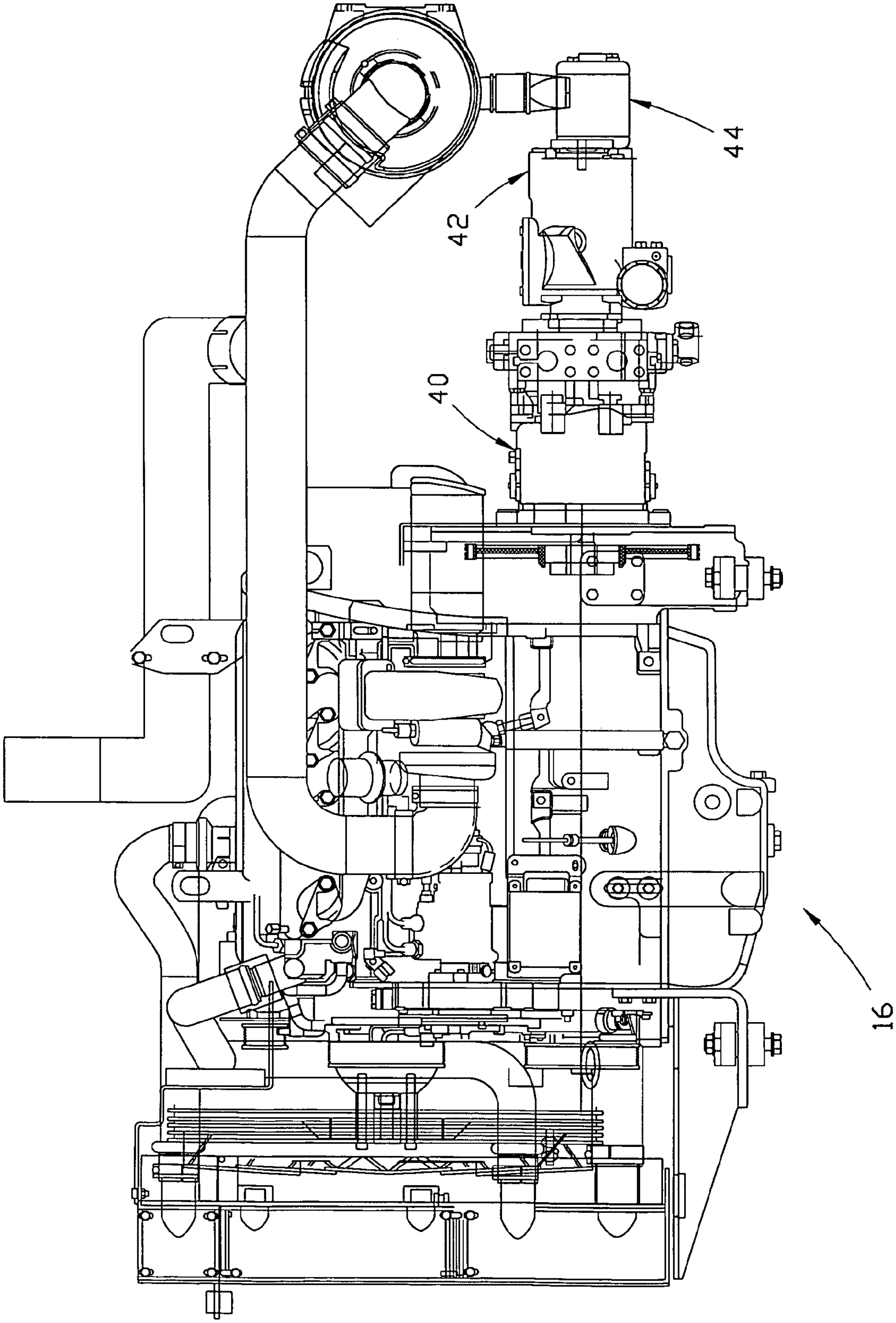
FIG. 3 is a side view of a portion of the horizontal directional drilling machine of FIGS. 1-2, showing the engine and three hydraulic fluid pumps.
Figure 4:
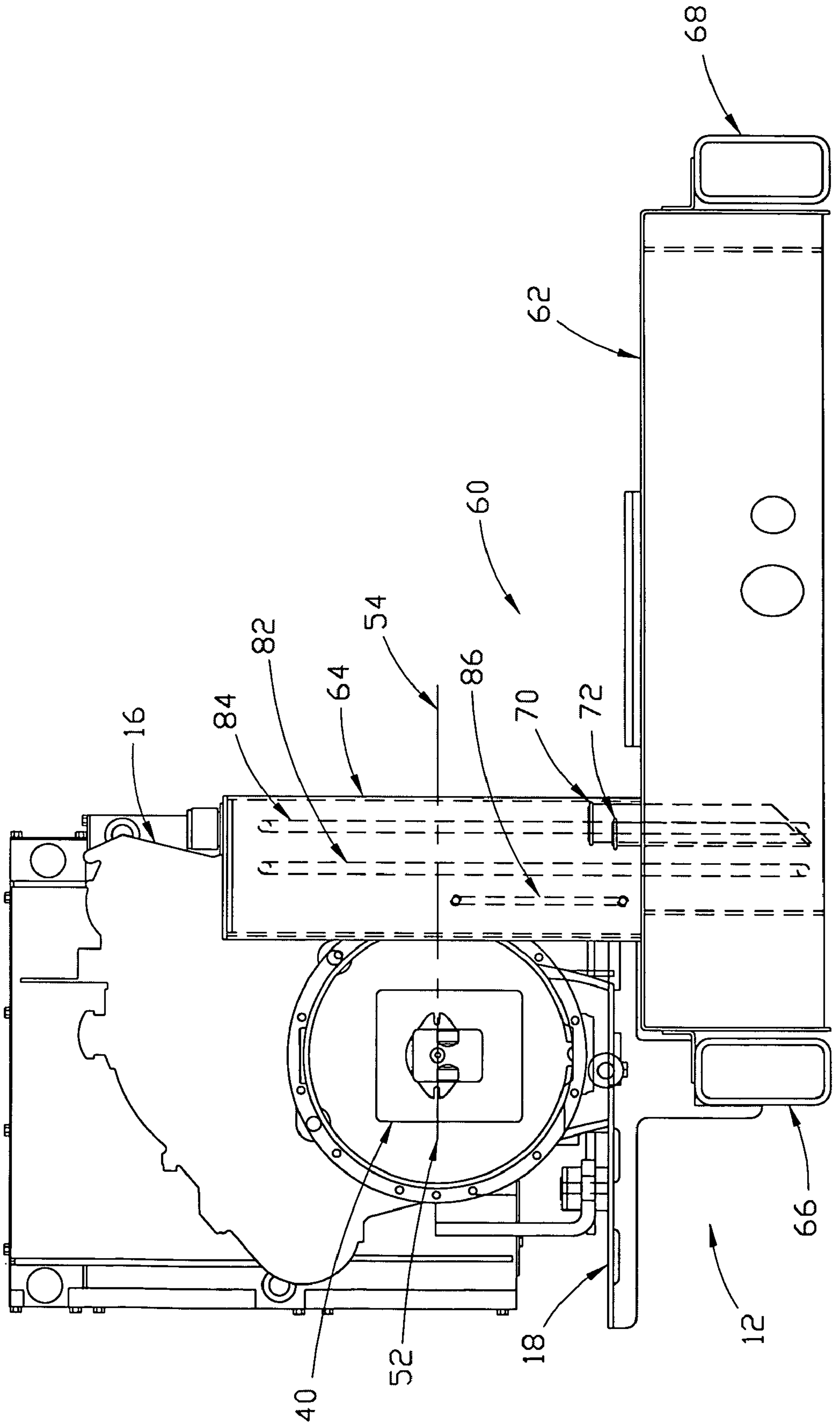
FIG. 4 is a partial sectional view of the horizontal directional drilling machine of FIG. 2, taken along line 4-4.

As shown in FIG. 3 (and schematically in FIG. 4), a plurality of hydraulic fluid pumps, 40, 42 and 44 are mounted adjacent to engine 16 on chassis 12. As shown in FIG. 4, engine 16 is mounted on base level 18 and pumps 40, 42 and 44 are preferably mounted at or above the base level. Preferably, pump 40 is a closed loop pump that is adapted to supply hydraulic fluid to hydraulic motor 28, and pump 42 is an open loop pump that supplies hydraulic fluid to all other hydraulic systems of machine 10. In the preferred embodiment illustrated in the drawings, pump 44 is an open loop boost pump that is adapted to maintain a minimum pressure in pump 40 and to replenish any hydraulic oil that leaks past mechanical clearances in the hydraulic circuit. Each pump has a suction port into which hydraulic fluid is received from hydraulic tank 50 and a discharge port through which hydraulic fluid is pumped. The pumps are arranged so that their suction ports (shown schematically at 52 in FIG. 4) all have a common pump suction centerline 54.

Hydraulic tank 60 includes primary chamber 62 and secondary chamber 64 which is in located above the primary chamber and in fluid communication therewith. Together the primary and secondary chambers provide a tank volume to receive and hold hydraulic fluid. In the preferred embodiment of the invention illustrated in the drawings, the tank volume is about 70-100 gallons. Preferably, the primary chamber has a primary volume comprising about 90% of the tank volume, or about 63-90 gallons. The primary chamber is located entirely below the hydraulic pumps, and preferably, as shown in FIG. 3, primary chamber 62 is mounted below base level 18 of the chassis between chassis frame members 66 and 68. Primary chamber 62 includes a pair of suction ports 70 and 72 that provide fluid communication with hydraulic supply lines (not shown) to pump 42 and pump 44 respectively.

The remainder of the tank volume (that is not provided by primary chamber 62) is provided by secondary chamber 64, which is sized and configured to allow for thermal expansion of hydraulic fluid in the amount of at least about 5% of the tank volume as the hydraulic fluid in the tank reaches its normal operating temperature during operation of the drilling machine. Preferably, the volume of the secondary chamber (the secondary volume) comprises about 10% of the tank volume in order to keep the center of mass of tank 60 low on machine 10, and so consequently, in the preferred embodiment illustrated in the drawings, the secondary volume comprises about 7-10 gallons.

In order to accommodate the desired thermal expansion, it is preferred that the depth of the secondary chamber at its shallowest point be at least as great as the depth of the primary chamber at its deepest point. Even better results can be obtained when the depth $D_2$ of the secondary chamber at its shallowest point (see FIG. 5) is at least twice the depth $D_1$ of the primary chamber at its deepest point.

Figure 5:
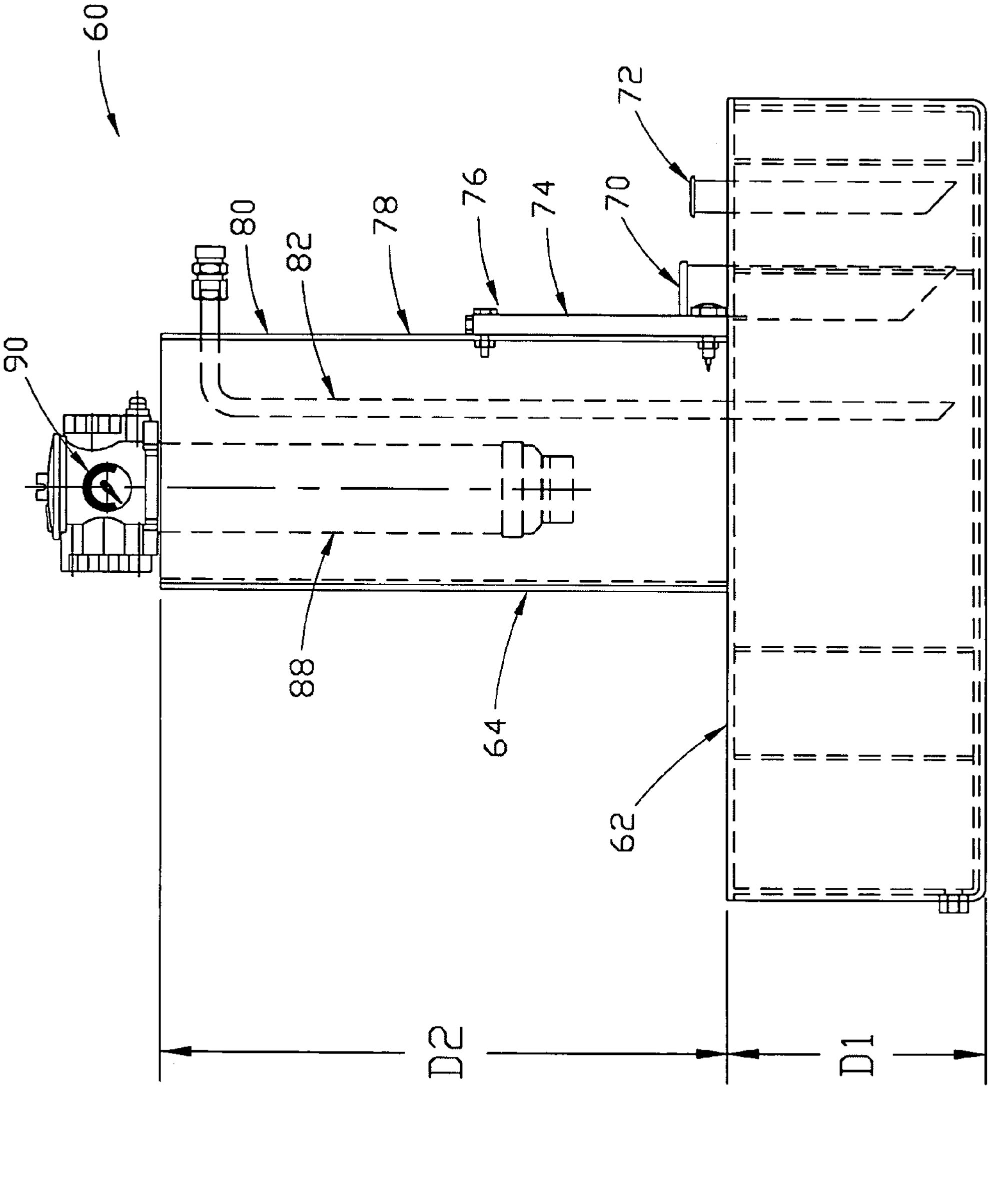
FIG. 5 is a side view of a portion of a preferred embodiment of the invention.

As drilling operations begin and hydraulic fluid is circulated through the hydraulic system, the temperature of the fluid increases from the ambient temperature to its normal operating temperature. The normal operating temperature will depend to some extent on ambient conditions, the surface area of the tank, the amount of thermal insulation on the tank (if any), and on the type and number of components in the hydraulic system. FIG. 5 illustrates the importance of this feature of the invention. As shown therein, level 74 is the hydraulic fluid level in tank 60 when the hydraulic fluid is at about 50° F., a typical hydraulic fluid temperature prior to beginning drilling operations. Level 76 is the hydraulic fluid level reached due to thermal expansion when the temperature of the fluid in the tank reaches about 80° F., and level 78 is the hydraulic fluid level reached when the temperature of the fluid in the tank reaches about 140° F. Level 80 is the hydraulic fluid level reached due to thermal expansion when the temperature of the fluid in the tank reaches about 200° F. As the level of hydraulic fluid rises in secondary chamber 64, the positive pressure at pump suction centerline 54 (as well as the positive pressure at suction ports 70 and 72) will increase. For example, in a tank having a tank volume of 82 gallons and a secondary chamber having a cross-sectional area of about 80 $in^2$ and a volume of about 8.5 gallons, the expansion of hydraulic fluid due to an increase in the temperature of the fluid from about 50° F. to about 80° F. will increase the positive pressure by about 0.1 psi. Similarly, the expansion of hydraulic fluid due to an increase in the temperature of the fluid from about 50° F. to about 140° F. will increase the positive pressure by about 0.25 psi, and the expansion of hydraulic fluid due to an increase in the temperature of the fluid from about 50° F. to about 200° F. will increase the positive pressure by about 0.4 psi.

Secondary chamber 74 includes a pair of tank return ports 82 and 84 that are located above pump suction centerline 54. These tank return ports provide fluid communication with hydraulic return lines (not shown) from pump 42 and pump 44 respectively. Secondary chamber 74 also includes sight gauge 86 and return filter 88 for the hydraulic system. Gauge 90 is a pressure differential gauge which indicates whether the filter is clogged with debris.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A hydraulic fluid tank for a drilling machine which tank has a tank volume, said drilling machine including a hydraulic pump having a pump suction port which includes a pump suction centerline, wherein the tank comprises:

(a) a primary chamber that is located entirely below the hydraulic pump, said primary chamber having a primary volume;

(b) a secondary chamber which is:

(i) located above the primary chamber and has a secondary volume;

(ii) in fluid communication with the primary chamber so that the primary volume of the primary chamber and the secondary volume of the secondary chamber together provide the tank volume to receive and hold hydraulic fluid;

(iii) adapted to maintain a hydraulic fluid level that is above the pump suction centerline as the hydraulic fluid in the tank reaches its normal operating temperature during operation of the drilling machine;

(iv) sized and configured to allow for thermal expansion of hydraulic fluid in the amount of at least about 5% of the tank volume as the hydraulic fluid in the tank reaches its normal operating temperature during operation of the drilling machine.

2. The hydraulic fluid tank of claim 1 wherein the secondary volume of the secondary chamber comprises about 10% of the tank volume.

3. The hydraulic fluid tank of claim 1 wherein the depth of the secondary chamber at its shallowest point is at least as great as the depth of the primary chamber at its deepest point.

4. The hydraulic fluid tank of claim 1 wherein the depth of the secondary chamber at its shallowest point is at least twice the depth of the primary chamber at its deepest point.

5. The hydraulic fluid tank of claim 1:

(a) which includes a tank suction port that is in fluid communication with the primary chamber;

(b) wherein the secondary chamber is sized and configured to allow for thermal expansion of the hydraulic fluid in the tank during operation of the drilling machine that increases the positive pressure at the tank suction port.

6. The hydraulic fluid tank of claim 5 which includes a tank return port in the secondary chamber.

7. The hydraulic fluid tank of claim 5 wherein the secondary chamber is sized and configured so as to allow for thermal expansion of the hydraulic fluid in the tank as the hydraulic fluid in the tank reaches its normal operating temperature during operation of the drilling machine to increase the positive pressure on the tank suction port by at least about 0.25 psi.

8. The hydraulic fluid tank of claim 5 wherein the secondary chamber is sized and configured so as to allow for thermal expansion of the hydraulic fluid in the tank as the hydraulic fluid in the tank reaches its normal operating temperature during operation of the drilling machine to increase the positive pressure on the tank suction port by at least about 0.40 psi.

9. A drilling machine comprising:

(a) a chassis having a base level;

(b) a thrust frame which is attached to the chassis;

(c) a drilling mechanism which is mounted on the thrust frame, said drilling mechanism being adapted to rotate a boring tool;

(d) a hydraulic motor for driving the drilling mechanism;

(e) a hydraulic pump for supplying hydraulic fluid to the hydraulic motor, said hydraulic pump:

(i) being mounted at or above the base level of the chassis;

(ii) having a pump suction port which includes a pump suction centerline that is located above the base level of the chassis;

(f) an engine for driving the hydraulic pump, said engine being mounted on the base level of the chassis;

(g) a tank for the hydraulic fluid, said tank having a tank volume, wherein the tank comprises:

(i) a primary chamber that is located entirely below the pump suction centerline, said primary chamber having a primary volume;

(ii) a secondary chamber that is in fluid communication with the primary chamber, said secondary chamber having a secondary volume so that the primary volume of the primary chamber and the secondary volume of the secondary chamber together provide the tank volume to receive and hold the hydraulic fluid, said secondary chamber being sized and configured to allow for thermal expansion of the hydraulic fluid in the amount of at least about 5% of the tank volume as the hydraulic fluid in the tank reaches its normal operating temperature during operation of the drilling machine.

10. The drilling machine of claim 9 wherein the secondary volume of the secondary chamber of the hydraulic fluid tank comprises about 10% of the tank volume.

11. The drilling machine of claim 9 wherein the primary chamber of the hydraulic fluid tank is located entirely below the base level of the chassis.

12. The drilling machine of claim 9 wherein the depth of the secondary chamber of the hydraulic fluid tank at its shallowest point is at least as great as the depth of the primary chamber at its deepest point.

13. The drilling machine of claim 9 wherein the depth of the secondary chamber at its shallowest point is at least twice the depth of the primary chamber at its deepest point.

14. The drilling machine of claim 9 wherein:

(a) the hydraulic fluid tank includes a tank suction port that is in fluid communication with the primary chamber;

(b) the secondary chamber is sized and configured to allow for thermal expansion of the hydraulic fluid in the tank during operation of the drilling machine that increases the positive pressure at the tank suction port.

15. The drilling machine of claim 14 wherein the hydraulic fluid tank includes a tank return port in the secondary chamber.

16. The drilling machine of claim 14 wherein the secondary chamber is sized and configured so as to allow for thermal expansion of the hydraulic fluid in the tank as the hydraulic fluid in the tank reaches its normal operating temperature during operation of the drilling machine to increase the positive pressure on the tank suction port by at least about 0.25 psi.

17. The drilling machine of claim 14 wherein the secondary chamber is sized and configured so as to allow for thermal expansion of the hydraulic fluid in the tank as the hydraulic fluid in the tank reaches its normal operating temperature during operation of the drilling machine to increase the positive pressure on the tank suction port by at least about 0.40 psi.

18. The drilling machine of claim 9:

(a) wherein the thrust frame is adapted to be tilted from a lowered position to a raised drilling position in which it is aligned at an oblique angle with respect to the chassis;

(b) wherein the drilling mechanism comprises:

(i) a drive carriage that is mounted on the thrust frame;

(ii) a pipe-rotation mechanism that is mounted on the drive carriage and adapted to rotate a boring tool;

(iii) a first hydraulic motor for driving the pipe-rotation mechanism;

(iv) a carriage drive assembly that is mounted on the drive carriage and adapted to push the carriage along the thrust frame, said carriage drive assembly including a second hydraulic motor;

(c) which includes a first hydraulic fluid pump for supplying hydraulic fluid to the first hydraulic motor, said first hydraulic pump:
   (i) being mounted at or above the base level of the chassis;
   (ii) having a first hydraulic pump suction port which includes a first pump suction centerline that is located above the base level of the chassis;
(d) which includes a second hydraulic fluid pump for supplying hydraulic fluid to the second hydraulic motor, said second hydraulic pump:
   (i) being mounted at or above the base level of the chassis;
   (ii) having a second hydraulic pump suction port which includes a second pump suction centerline that is located above the base level of the chassis.

19. The drilling machine of claim 18 wherein the first pump suction centerline coincides with the second pump suction centerline.

* * * * *